United States Patent
Li et al.

(10) Patent No.: US 12,181,205 B2
(45) Date of Patent: Dec. 31, 2024

(54) INSTALLATION FOOT AND REFRIGERATOR HAVING SAME

(71) Applicants: QINGDAO HAIER REFRIGERATOR CO., LTD., Shandong (CN); HAIER SMART HOME CO., LTD., Shandong (CN)

(72) Inventors: Xiaofeng Li, Shandong (CN); Changzhi Wang, Shandong (CN); Bin Fei, Shandong (CN); Enpin Xia, Shandong (CN); Xiaobing Zhu, Shandong (CN); Kang Li, Shandong (CN)

(73) Assignees: QINGDAO HAIER REFRIGERATOR CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 203 days.

(21) Appl. No.: 18/011,968

(22) PCT Filed: May 8, 2021

(86) PCT No.: PCT/CN2021/092305
§ 371 (c)(1),
(2) Date: Dec. 21, 2022

(87) PCT Pub. No.: WO2021/223749
PCT Pub. Date: Nov. 11, 2021

(65) Prior Publication Data
US 2023/0251017 A1    Aug. 10, 2023

(30) Foreign Application Priority Data
Jun. 30, 2020  (CN) .......................... 202010616654.2

(51) Int. Cl.
*F25D 23/00*     (2006.01)
*F16G 1/28*      (2006.01)

(52) U.S. Cl.
CPC ............. *F25D 23/00* (2013.01); *F16G 1/28* (2013.01); *F25D 2400/32* (2013.01); *F25D 2400/38* (2013.01)

(58) Field of Classification Search
CPC .. F25D 23/00; F25D 2400/32; F25D 2400/38; F25D 2323/0011; F16G 1/28; F16M 7/00
See application file for complete search history.

(56) References Cited

U.S. PATENT DOCUMENTS 4,789,121 A  * 12/1988  Gidseg .................... F16M 7/00
                                                    248/188.4
4,955,569 A  *  9/1990  Hottmann ............... F16M 7/00
                                                    248/188.4
(Continued)

FOREIGN PATENT DOCUMENTS

CN         2333979 Y       8/1999
CN       201346192 Y   * 11/2009
(Continued)

OTHER PUBLICATIONS

EPO, "Supplementary European Search Report for EP Application No. 21800311.9", Hague, Germany, Sep. 13, 2023.
(Continued)

*Primary Examiner* — Emmanuel E Duke
(74) *Attorney, Agent, or Firm* — Locke Lord LLP; Tim Tingkang Xia, Esq.

(57) ABSTRACT

Provided are an installation foot and a refrigerator having same, the installation foot including: a support base, a part of which forms a support platform; a roller wheel, rollably disposed below the support platform; a first adjustment portion, provided with a first screw rod and a first adjustment rotary disc, the first screw rod being rotatably disposed on the support platform, and the first adjustment rotary disc being fixedly connected to the first screw rod or integrated with the first screw rod to drive the first screw rod to rotate; and a second adjustment portion, provided with a second screw rod and a second adjustment rotary disc, the second screw rod being rotatably disposed on the support platform, and the second adjustment rotary disc being fixedly con-
(Continued)

nected to the second screw rod or integrated with the second screw rod to drive the second screw rod to rotate.

10 Claims, 6 Drawing Sheets

(56) References Cited

U.S. PATENT DOCUMENTS

| | | | | |
|---|---|---|---|---|
| 5,215,367 | A * | 6/1993 | Montuoro | E05D 11/00 248/188.4 |
| 7,350,269 | B2 * | 4/2008 | Dominic | B60B 33/0002 16/30 |
| 2005/0247834 | A1 | 11/2005 | Thuelig | |
| 2011/0297802 | A1 * | 12/2011 | Gennaretti | D06F 39/125 248/188.4 |
| 2016/0081474 | A1 * | 3/2016 | Basesme | A47B 91/02 248/188.4 |

FOREIGN PATENT DOCUMENTS

| | | | | |
|---|---|---|---|---|
| CN | 204590892 | U | | 8/2015 |
| CN | 105042997 | A | | 11/2015 |
| CN | 106568288 | A | * | 4/2017 |
| CN | 210625044 | U | | 5/2020 |
| JP | 2001050641 | A | * | 2/2001 |
| JP | 2007139256 | A | | 6/2007 |
| JP | 2009036458 | A | | 2/2009 |
| KR | 19990001119 | U | | 1/1999 |
| KR | 19990002760 | U | | 1/1999 |
| KR | 20040046106 | A | | 6/2004 |
| WO | WO-2016080086 | A1 | * | 5/2016 ............. F25D 23/00 |

OTHER PUBLICATIONS

Chinese Intellectual Property Office (ISR/CN), "International Search Report for PCT/CN2021/092305", China, Jul. 15, 2021.
SIPO, "1st CN Office Action and Search Report for CN Application No. 202010616654.2", China.
JPO, "Office Action for JP Application No. 2022-579679", Japan.

* cited by examiner

INSTALLATION FOOT AND REFRIGERATOR HAVING SAME

CROSS-REFERENCE TO RELATED PATENT APPLICATIONS

This application is a U.S. national stage application of PCT Patent Application No. PCT/CN2021/092305 filed on May 8, 2021, which claims priority to and the benefit of Chinese Application No. 202010616654.2 filed Jun. 30, 2020, which are incorporated herein in their entireties by reference.

FIELD OF THE INVENTION

The present invention relates to an apparatus installation technology, and in particular to an installation foot and a refrigerator having same.

BACKGROUND OF THE INVENTION

An installation foot is used to be installed at a bottom of an apparatus to support the apparatus on the ground.

Some of installation feet in the prior art can adjust the parallelism of bottoms of apparatuses when the apparatuses are in a stationary state. However, due to a high friction between the installation foot and the ground in use, it will be very laborious to move the apparatus in an installation process, resulting in difficult operation and low installation efficiency of the entire installation process.

Therefore, how to improve the structure of the installation foot to reduce the installation difficulty of the apparatus has become an urgent technical problem to be solved by those skilled in the art.

BRIEF DESCRIPTION OF THE INVENTION

An object of the present invention is to provide an installation foot and a refrigerator having same that at least solve any aspect of the above technical problem.

A further object of the present invention is to improve the structure of an installation foot so as to reduce the installation difficulty of an apparatus.

A further object of the present invention is to use an installation foot to improve the adjustment stability of an apparatus in the processes of installation and adjustment.

Another further object of the present invention is to simplify the adjustment process of an installation foot.

Another still further object of the present invention is to reduce or avoid the wear of a roller wheel and thus prolong the service life of an installation foot.

One more still further object of the present invention is to simplify the installation structure of a refrigerator and thus reduce the manufacturing cost.

According to an aspect of the present invention, provided is an installation foot, including: a support base, one part of which forms a support platform; a roller wheel, rollably disposed below the support platform; a first adjustment portion, provided with a first screw rod and a first adjustment rotary disc, the first screw rod being rotatably disposed on the support platform, and the first adjustment rotary disc being fixedly connected to the first screw rod or integrated with the first screw rod to form a one-piece part so as to drive the first screw rod to rotate; and a second adjustment portion, provided with a second screw rod and a second adjustment rotary disc, the second screw rod being rotatably disposed on the support platform, and the second adjustment rotary disc being fixedly connected to the second screw rod or integrated with the second screw rod to form a one-piece part so as to drive the second screw rod to rotate.

Optionally, the first adjustment rotary disc and the second adjustment rotary disc are both disc-shaped; a plurality of first gear teeth are formed on an outer peripheral edge of the first adjustment rotary disc to match a wrench tool and/or a drive belt; and a plurality of second gear teeth are formed on an outer peripheral edge of the second adjustment rotary disc to match the wrench tool and/or the drive belt.

Optionally, the disc diameter of the first adjustment rotary disc is larger than that of the second adjustment rotary disc; the second gear teeth are in transmission meshing with the first gear teeth; and the screw direction of the first screw rod is opposite to that of the second screw rod.

Optionally, the rotation axes of the first adjustment rotary disc and the first screw rod are coaxial with the central axis of the first adjustment rotary disc and the central axis of the first screw rod; the first adjustment rotary disc extends radially outwards from a bottom section of the first screw rod; the rotation axes of the second adjustment rotary disc and the second screw rod are coaxial with the central axis of the second adjustment rotary disc and the central axis of the second screw rod; and the second adjustment rotary disc extends radially outwards from a bottom section of the second screw rod.

Optionally, the support platform is a horizontal plate wall portion on the support base; the roller wheel includes a wheel shaft extending in a horizontal direction, and a wheel body rotating around the wheel shaft; and the support base further includes: a downturned shaft connecting portion, extending downward from the support platform and having a shaft hole for matching with the wheel shaft so as to enable the wheel shaft to be rotatably connected to the support base.

Optionally, the support platform is provided with a first unthreaded hole and a second unthreaded hole which run through a thickness direction of a main body plate surface of the support platform; the first adjustment portion is positioned above the first unthreaded hole, and the second adjustment portion is positioned above the second unthreaded hole; and the installation foot further includes: a first connecting piece, one end of which is fixedly connected to the first adjustment portion or is integrated with the first adjustment portion to form a one-piece part, and the other end of which passes through the first unthreaded hole and is matched with a lower peripheral edge of the first unthreaded hole to limit the freedom of the first adjustment portion to move in a straight line relative to the support platform in its rotation axis direction; and a second connecting piece, one end of which is fixedly connected to the second adjustment portion or is integrated with the second adjustment portion to form a one-piece part, and the other end of which passes through the second unthreaded hole and is matched with a lower peripheral edge of the second unthreaded hole to limit the freedom of the second adjustment portion to move in a straight line relative to the support platform in its rotation axis direction.

Optionally, both the first connecting piece and the second connecting piece are hollow cylindrical claws with a plurality of convex buckles in the circumferential directions of lower edges thereof, each of the convex buckles has an interstice opening between peripheral wall sections of the claw where it is located, a lower surface of each of the convex buckles is an inclined surface that is inclined upward in a radial outward direction, and an upper surface of each of the convex buckles is a plane perpendicular to peripheral walls of the claws.

Optionally, each of the hole wall of the first unthreaded hole and the hole wall of the second unthreaded hole is provided with a lower annular flange on a lower surface of the support platform so as to form a snap fit with the upper surfaces of the convex buckles.

Optionally, the first unthreaded hole and the second unthreaded hole are symmetrically disposed with respect to the central axis of the support platform.

According to an aspect of the present invention, also provided is a refrigerator, including: at least one installation foot according to any one as described above, disposed at a bottom of the refrigerator, the bottom of the refrigerator being provided with a first threaded hole and a second threaded hole, the first screw rod being in a screwed connection with the first threaded hole, and the second screw rod being in a screwed connection with the second threaded hole.

According to the installation foot and the refrigerator having same of the present invention, the installation foot includes the support base, the roller wheel, the first adjustment portion and the second adjustment portion. The roller wheel is rotatably disposed under the support platform of the support base, and the first adjustment portion and the second adjustment portion are separately provided with the screw rod rotatably disposed on the support platform, and the adjustment rotary disc for driving the screw rod to rotate. In an installation process, the roller wheel is able to roll along a supporting surface on which the installation foot is located, and the screw rods can rotate relative to the support platform, so that the installation foot of the present invention is both suitable for a leveling process of an apparatus and suitable for a moving process of the apparatus, and is also small in volume, simple and easy to adjust, large in adjustment range and low in manufacturing cost. By adopting the installation foot of the present invention, the installation difficulty of the apparatus can be reduced, the installation efficiency can be increased, and the labor cost is thus lowered.

Further, according to the installation foot and the refrigerator having same of the present invention, during the installation of the apparatus, the first adjustment rotary disc and the second adjustment rotary disc can be adjusted respectively, so that the screwing depths of the first screw rod and the second screw rod into the corresponding threaded holes can be adjusted, which is beneficial to improving the adjustment stability and reliability of the apparatus in the processes of installation and adjustment, reducing or avoiding the shaking of the apparatus in the processes of installation and adjustment, and improving the installation quality.

Further, according to the installation foot and the refrigerator having same of the present invention, the first adjustment rotary disc of the first adjustment portion and the second adjustment rotary disc of the second adjustment portion are both discs with gear teeth on their outer peripheral edges, and the gear teeth of the second adjustment rotary disc can be in transmission meshing with the gear teeth of the first adjustment rotary disc. During the installation of the apparatus, the wrench tool and/or the drive belt can also be used to adjust the first adjustment rotary disc and make the first adjustment rotary disc drive the second adjustment rotary disc to rotate so as to simultaneously adjust the screwing depths of the first screw rod and the second screw rod into the corresponding threaded holes, which can not only ensure the adjustment stability of the apparatus, but also simplify the adjustment process of the installation foot.

Further, according to the installation foot and the refrigerator having same of the present invention, since each of the screw rods can rotate relative to the support platform, when each of the adjustment rotary discs is driven to drive the corresponding screw rod to rotate, the support platform can be stationary, and thus the roller wheel can be prevented from rotating accordingly during the rotation of the screw rods, which not only makes the leveling process of the apparatus easy to operate, and saves time and effort, but also reduces or avoids the wear of the roller wheel and prolongs the service life of the installation foot.

Even furthermore, according to the installation foot and the refrigerator having same of the present invention, because the installation foot of the refrigerator has both a leveling function and a moving function, it is possible to reduce or avoid the installation of other auxiliary structures on the bottom of the refrigerator, thereby simplifying the installation structure of the refrigerator and reducing the manufacturing cost.

The above and other objects, advantages and features of the present invention will be more apparent to those skilled in the art from the following detailed description of specific embodiments of the present invention in conjunction with the accompanying drawings.

BRIEF DESCRIPTION OF THE DRAWINGS

Hereinafter, some specific embodiments of the present invention will be described in detail in an exemplary rather than limited manner with reference to the accompanying drawings. The same reference numerals in the accompanying drawings indicate the same or similar components or parts. Those skilled in the art should understand that these accompanying drawings are not necessarily drawn to scale. In the figures.

DETAILED DESCRIPTION

Figure 1:
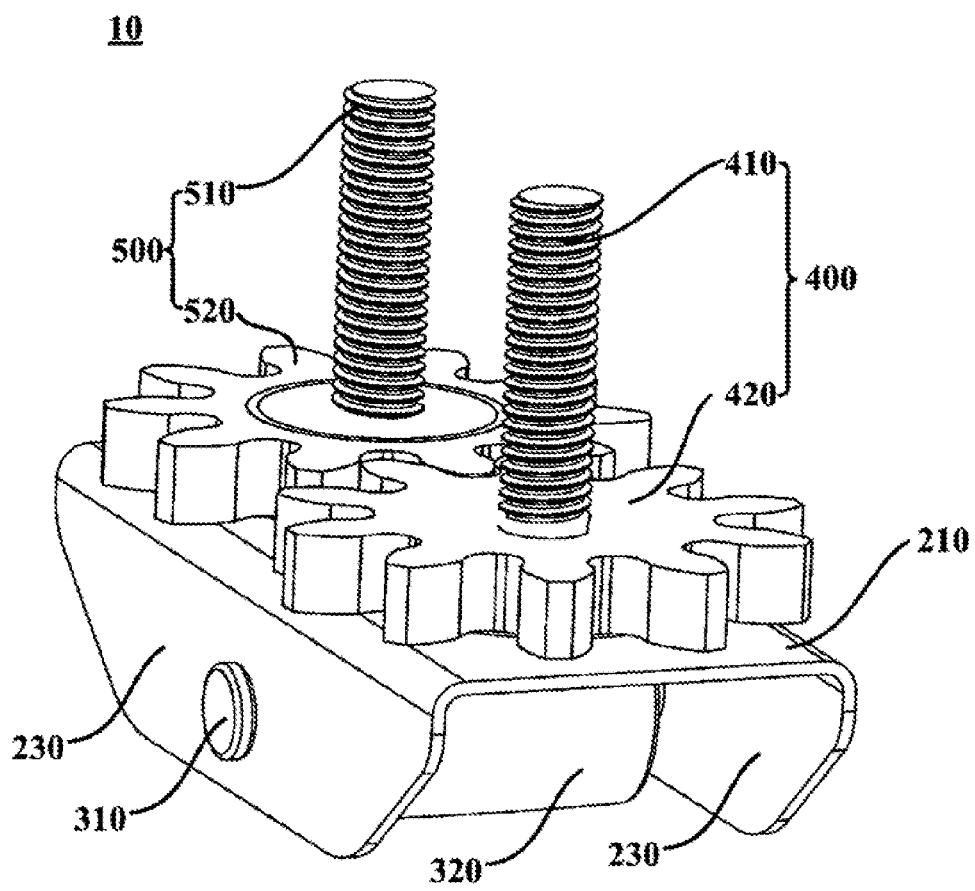
FIG. 1 is a schematic diagram of an installation foot according to an embodiment of the present invention.

FIG. 1 is a schematic diagram of an installation foot 10 according to an embodiment of the present invention. The installation foot 10 of the embodiment is suitable for being installed on a bottom of an apparatus for installing the apparatus to a set position. The installation foot 10 of the embodiment may be applied to various apparatuses, such as a refrigerator 70, an air conditioner, a washing machine, and other household appliances, and may also be applied to any other equipment, especially suitable for the built-in refrigerator 70.

The installation foot 10 may generally include a roller wheel, a support base and an adjustment portion, and may further include a connecting piece. The roller wheel is installed on the support base, and the adjustment portion is installed on the support base by means of the connecting piece. There may be two adjustment portions, including a first adjustment portion 400 and a second adjustment portion

500. There may also be two connecting pieces, including a first connecting piece and a second connecting piece.

The support base includes a support platform 210 and a downturned shaft connecting portion 230.

A part of the support base forms the support platform 210, and the support platform 210 may be a horizontal plate wall portion on the support base. The "horizontal" is relative to an actual use state of the installation foot 10. In some alternative embodiments, the plate wall of the support platform 210 may alternatively be a curved surface.

The shape of the support platform 210 may be substantially rectangular, circular, triangular or other arbitrary polygons. In the embodiment, the support platform 210 is substantially rectangular. The support platform 210 is provided with an unthreaded hole running through a thickness direction of a main body plate surface of the support platform 210. In the embodiment, there may be two unthreaded holes, which are a first unthreaded hole 211 and a second unthreaded hole 212, respectively. The first unthreaded hole 211 and the second unthreaded hole 212 are symmetrically disposed with respect to a central axis of the support platform 210, and the central axis may be a central axis extending in a width direction of the support platform 210. The "width direction" and "length direction" are relative terms.

The downturned shaft connecting portion 230 extends downward from the support platform 210, and has a shaft hole 231 for matching with a wheel shaft 310 (to be described in detail below) of the roller wheel so as to enable the wheel shaft 310 of the roller wheel to be rotatably connected to the support base. In the embodiment, the downturned shaft connecting portion 230 may be a vertical side wall portion of the support base. There may be two downturned shaft connecting portions 230, which are respectively formed by extending downward from opposite edge parts of the support platform 210. The "opposite edge parts" may be edge parts opposite in the width direction of the support platform 210. Each downturned shaft connecting portion 230 has the shaft hole 231. The shaft holes 231 of the two downturned shaft connecting portions 230 are disposed opposite to each other. Each shaft hole 231 matches one end of the wheel shaft 310 of the roller wheel.

In other alternative embodiments, the positions and number of the downturned shaft connecting portions 230 may be changed. There may be one downturned shaft connecting portion 230, which is formed by extending downward from the middle part of the support platform 210. The shaft hole 231 of the downturned shaft connecting portion 230 may match a middle section of the wheel shaft 310 of the roller wheel.

In some further embodiments, the support base may further include an upturned stop portion. The upturned stop portion extends upward from the support platform 210 for insertion into a corresponding clamp slot of the apparatus installed on the installation foot 10 to limit the rotation of the support platform 210 relative to the apparatus. Preferably, the upturned stop portion extends upward from a part of the support platform 210 with a distance from an adjustment rotary disc of the adjustment portion (to be described in detail below), which can prevent the upturned stop portion from obstructing the rotation of the adjustment rotary disc.

The roller wheel is rollably disposed below the support platform 210. For example, the roller wheel may be roughly located below a middle part of the support platform 210. The roller wheel includes the wheel shaft 310 extending in a horizontal direction and a wheel body 320 that rotates about the wheel shaft 310. The central axis of the wheel shaft 310 and the central axis of the support platform 210 extending in the width direction may be located in the same vertical plane.

The first adjustment portion 400 is positioned above the first unthreaded hole 211, and the second adjustment portion 500 is positioned above the second unthreaded hole 212. Each of the adjustment portions is provided with a screw rod and an adjustment rotary disc.

The first adjustment portion 400 is provided with a first screw rod 410 and a first adjustment rotary disc 420. The first screw rod 410 is rotatably disposed on the support platform 210. The first adjustment rotary disc 420 is fixedly connected to the first screw rod 410 or integrated with the first screw rod 410 to form a one-piece part so as to drive the first screw rod 410 to rotate.

The second adjustment portion 500 is provided with a second screw rod 510 and a second adjustment rotary disc 520. The second screw rod 510 is rotatably disposed on the support platform 210. The second adjustment rotary disc 520 is fixedly connected to the second screw rod 510 or integrated with the second screw rod 510 to form a one-piece part so as to drive the second screw rod 510 to rotate.

When the installation foot 10 is in use, the screw rods are in a screwed connection with threaded holes at the bottom of the apparatus, and the roller wheel is supported on a supporting surface, for example, the ground, of an installation space where the apparatus is located. During the installation of the apparatus, the roller wheel can roll along the supporting surface where the installation foot 10 is located, and the screw rods can rotate relative to the support platform 210, so that the installation foot 10 of the embodiment is both suitable for a leveling process of the apparatus and suitable for a moving process of the apparatus. By adopting the installation foot 10 of the embodiment, the installation difficulty of the apparatus can be reduced, the installation efficiency can be increased, and the labor cost is thus lowered.

For example, during the installation of the apparatus, a moving step can be performed first, and then a leveling step is performed. In the moving process, the roller wheel rolls along the supporting surface, which can reduce a frictional resistance during the movement and further reduce the difficulty of the movement. In the leveling step, by using the adjustment rotary discs to drive the screw rods to rotate, the screwing depths of the screw rods into the threaded holes at the bottom of the apparatus can be adjusted so as to adjust the height and/or parallelism of the bottom of the apparatus, with easy operation.

Since the screw rods can rotate relative to the support platform 210, when the adjustment rotary discs are driven to drive the screw rods to rotate, the support platform 210 can be stationary, and thus the roller wheel can be prevented from rotating accordingly during the rotation of the screw rods, which not only makes the leveling process of the apparatus easy to operate, and saves time and effort, but also reduces or avoids the wear of the roller wheel and prolongs the service life of the installation foot 10.

The installation foot 10 of the embodiment includes the two adjustment portions. During the installation of the apparatus, the first adjustment rotary disc 420 and the second adjustment rotary disc 520 can be adjusted respectively, so that the screwing depths of the first screw rod 410 and the second screw rod 510 into the corresponding threaded holes can be adjusted, which is conducive to improving the stability and reliability of the apparatus during installation and adjustment, reducing or avoiding shaking of the apparatus during installation and adjustment, and improving the installation quality.

Figure 2:
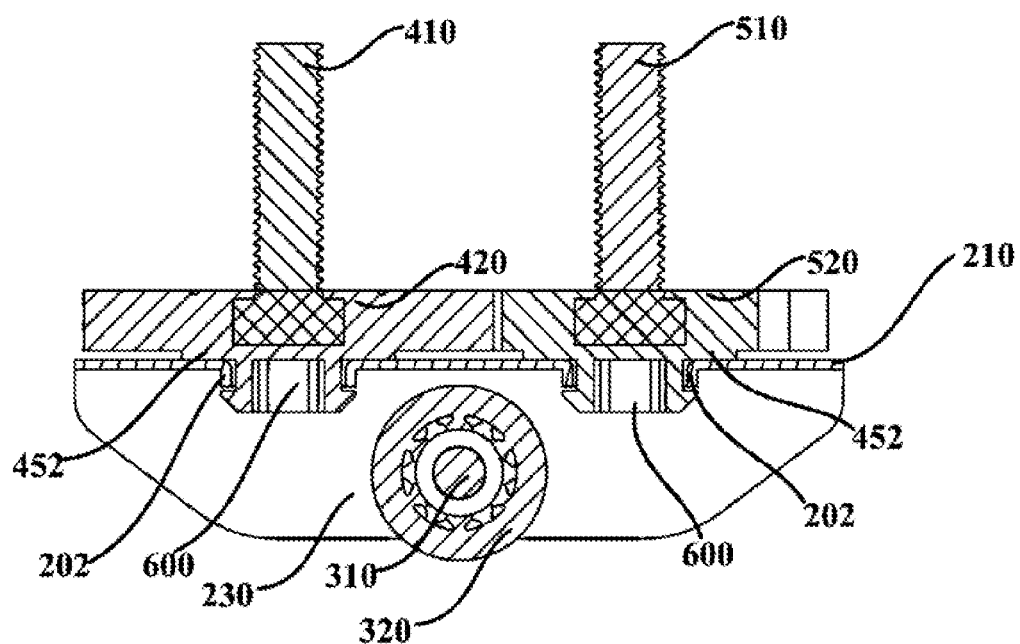
FIG. 2 is a sectional view of the installation foot shown in FIG. 1.

FIG. 2 is a sectional view of the installation foot 10 shown in FIG. 1.

The rotation axes of the first adjustment rotary disc 420 and the first screw rod 410 are coaxial with the central axis of the first adjustment rotary disc 420 and the central axis of the first screw rod 410. The first adjustment rotary disc 420 extends radially outwards from a bottom section of the first screw rod 410. The rotation axes of the second adjustment rotary disc 520 and the second screw rod 510 are coaxial with the central axis of the second adjustment rotary disc 520 and the central axis of the second screw rod 510. The second adjustment rotary disc 520 extends radially outwards from a bottom section of the second screw rod 510.

In the embodiment, both the rotation axis of the first screw rod 410 and the rotation axis of the second screw rod 510 extend in a vertical direction. That is, the directions of the rotation axes of each adjustment rotary disc and the corresponding screw rod may be the vertical direction. Each screw rod can be formed by extending upward from the middle part of the corresponding adjustment rotary disc. Heads of the screw rods can be buried in the adjustment rotary discs, which can simplify the molding process of the adjustment portions. The heads of the screw rods are integrated with the screw rods to form a one-piece part. The heads of the screw rods may be formed by extending radially outward from the bottom sections of the screw rods.

The first adjustment rotary disc 420 and the second adjustment rotary disc 520 are both disc-shaped. A plurality of first gear teeth 421 are formed on the outer peripheral edge of the first adjustment rotary disc 420 to match a wrench tool and/or a drive belt (e.g., a synchronous chain, or a synchronous belt). A plurality of second gear teeth 521 are formed on the outer peripheral edge of the second adjustment rotary disc 520 to match the wrench tool and/or the drive belt (e.g., the synchronous chain, or the synchronous belt). Each of the adjustment rotary discs may have the same set thickness to facilitate the application of a force by the wrench tool and/or the drive belt on the adjustment rotary discs. The set thickness can be designed according to actual application conditions, for example, it can be 0.5-10 cm, or it can be any value greater than 10 cm. In other alternative embodiments, the shapes of the adjustment rotary discs can be changed, for example, the shapes of the adjustment rotary discs may also be square, hexagonal, or any other shape.

Generally, when the installation space of the apparatus is relatively small, the installation personnel cannot reach some parts of the apparatus, which will limit the installation personnel to adjust the apparatus at these parts, resulting in a great difficulty in the leveling process.

The adjustment rotary discs of the embodiment can match the drive belt, and a driving member, for example, a gear or a cylindrical body with a groove on the outer peripheral edge, can be disposed at a position that is easy for the installation personnel to operate. The installation foot 10, the drive belt and the driving member can form an installation system. The drive belt is wound around the driving member and the adjustment rotary discs, and the adjustment rotary discs can be driven to rotate by rotating the driving member, thereby greatly reducing the leveling difficulty of the apparatus.

For example, when the refrigerator 70 is embedded into a cabinet, a drive belt can be used to drive the adjustment rotary discs to rotate, thereby indirectly driving the screw rods to rotate. Due to the limited internal space of the cabinet, the installation system can reduce the leveling difficulty when the refrigerator 70 is embedded into the cabinet.

The second gear teeth 521 are in transmission meshing with the first gear teeth 421, which can make the second adjustment rotary disc 520 rotate along with the first adjustment rotary disc 420 passively. The disc diameter of the first adjustment rotary disc 420 is greater than that of the second adjustment rotary disc 520. The disc diameter refers to the diameter of a circle where the outer peripheral edge of the disc is located. The disc diameter of the first adjustment rotary disc 420 is greater than that of the second adjustment rotary disc 520, which facilitates the arrangement of the drive belt on the installation foot 10. The drive belt can be sleeved on the first adjustment rotary disc 420, thus directly driving the first adjustment rotary disc 420 to rotate. The second adjustment rotary disc 520 can be passively disposed at one side of the first adjustment rotary disc 420, and is positioned at an inner side of the drive belt, so as to be driven by the first adjustment rotary disc 420 to rotate accordingly.

For the installation foot 10 of the embodiment, during the installation of the apparatus, the wrench tool and/or the drive belt can also be used to adjust the first adjustment rotary disc 420, and make the first adjustment rotary disc 420 drive the second adjustment rotary disc 520 to rotate, so as to simultaneously adjust the screwing depths of the first screw rod 410 and the second screw rod 510 into the corresponding threaded holes, which can not only ensure the adjustment stability of the apparatus, but also simplify the adjustment process of the installation foot 10.

The screw direction of the first screw rod 410 is opposite to that of the second screw rod 510, for example, the threads of the first screw rod 410 may be right-hand threads, and the threads of the second screw rod 510 may be left-hand threads. The second adjustment rotary disc 520 rotates along with the first adjustment rotary disc 420 passively, and the screw directions of the two screw rods are set to be opposite, which can ensure that the two screw rods are screwed into or out of the corresponding threaded holes synchronously, so that the consistency of the first adjustment portion 400 and the second adjustment portion 500 is guaranteed during the adjustment.

Figure 3:
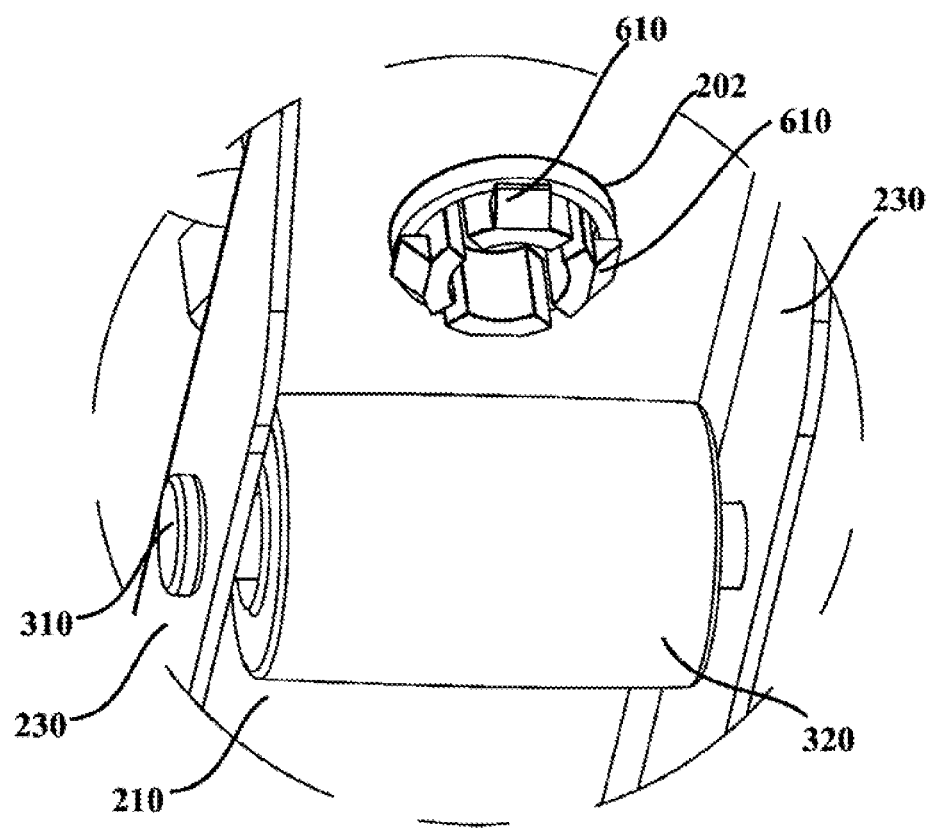
FIG. 3 is a bottom view of a partial area at a bottom of the installation foot shown in FIG. 1.
Figure 4:
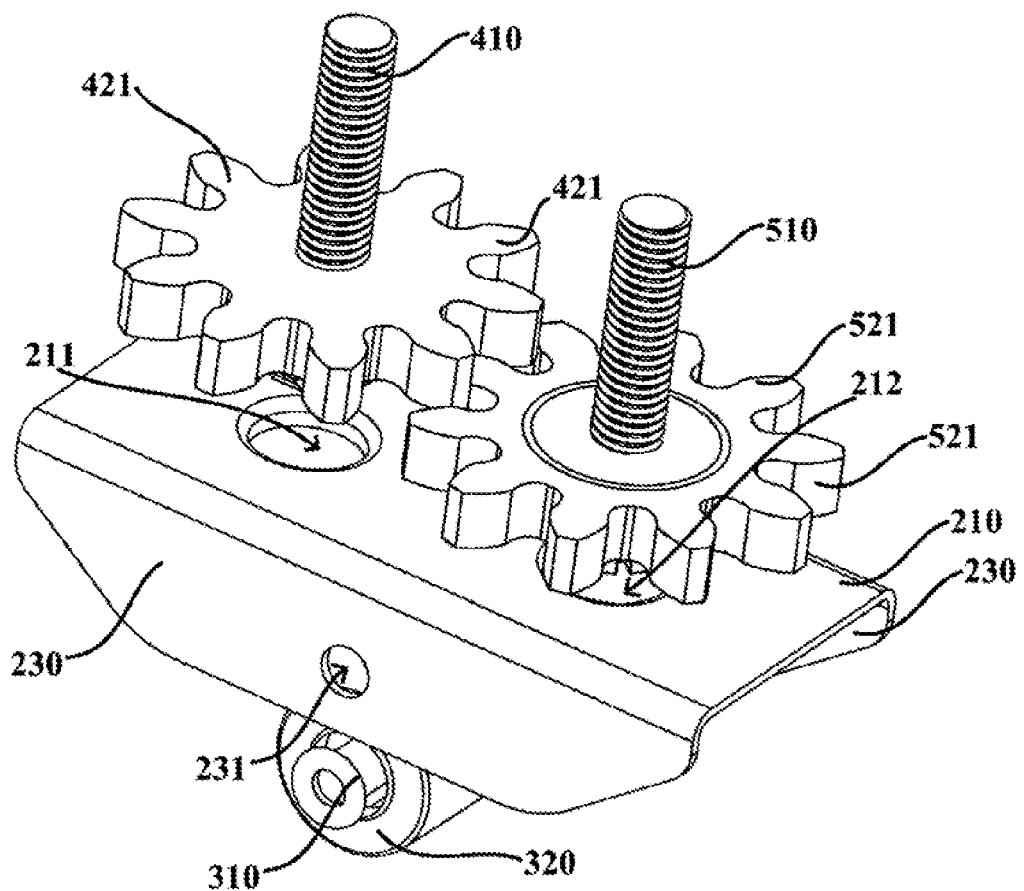
FIG. 4 is an exploded view of the installation foot shown in FIG. 1.
Figure 5:
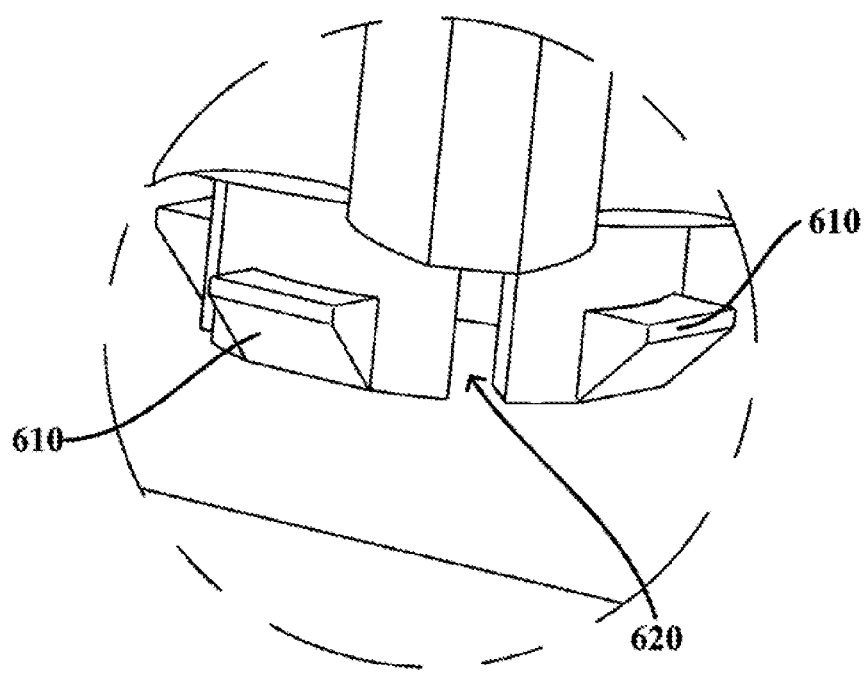
FIG. 5 is a schematic view of a partial area of a connecting piece of the installation foot shown in FIG. 4.

FIG. 3 is a bottom view of a partial area at a bottom of the installation foot 10 shown in FIG. 1. FIG. 4 is an exploded view of the installation foot 10 shown in FIG. 1. FIG. 5 is a schematic view of a partial area of the connecting piece of the installation foot 10 shown in FIG. 4.

One end of the first connecting piece is fixedly connected to the first adjustment portion 400 or is integrated with the first adjustment portion 400 to form a one-piece part, and the other end thereof passes through the first unthreaded hole 211 and is matched with the lower peripheral edge of the first unthreaded hole 211 to limit the freedom of the first adjustment portion 400 to move in a straight line relative to the support platform 210 in its rotation axis direction. One end of the second connecting piece is fixedly connected to the second adjustment portion 500 or is integrated with the second adjustment portion 500 to form a one-piece part, and the other end thereof passes through the second unthreaded hole 212 and is matched with the lower peripheral edge of the second unthreaded hole 212 to limit the freedom of the second adjustment portion 500 to move in a straight line relative to the support platform 210 in its rotation axis direction. That is to say, in the installation process of the apparatus, when the adjustment portions rotate along their rotation axes, the connecting pieces will prevent the corresponding adjustment portions from moving in the vertical direction relative to the support platform 210, so that the adjustment portions will not be displaced relative to the support platform 210 in the vertical direction.

Each connecting piece is not fixedly connected with the lower peripheral edge of the corresponding unthreaded hole, which allows that the adjustment portion only rotates itself without driving the support platform 210 to rotate together, so that the rotation resistance can be reduced and the installation efficiency can be improved.

Each connecting piece may be a claw 600. Both the first connecting piece and the second connecting piece are hollow cylindrical claws 600 with a plurality of convex buckles 610 in the circumferential directions of lower edges. Each connecting piece can extend downward from the bottom wall of the adjustment rotary disc and pass through the corresponding unthreaded hole to match the lower peripheral edge of the unthreaded hole.

Each of the convex buckles 610 has an interstice opening 620 between peripheral wall sections of the claw 600 where it is located, that is, the convex buckles 610 are disposed in turn with interstices therebetween along the circumferential direction of the lower edge of each claw 600. When the lower edges of the claws 600 are inserted into the unthreaded holes, the outer peripheries of the lower edges of the claws 600 receive a radially inward force and shrink inwardly, so that the claws can smoothly pass through the unthreaded holes.

A lower surface of each of the convex buckles 610 is an inclined surface that is inclined upward in a radial outward direction, which facilitates the smooth passing of the lower edges of the claws 600 through the unthreaded holes. The "outward" is relative to an actual use state of the hollow cylindrical claws 600.

The central axes of the hollow cylindrical claws 600 extend in a vertical direction. An upper surface of each of the convex buckles 610 is a plane perpendicular to peripheral walls of the claws 600, and may be substantially a horizontal plane. The upper surface of each convex buckle 610 can be in a snap fit with the hole wall of the corresponding unthreaded hole. Each of the hole wall of the first unthreaded hole 211 and the hole wall of the second unthreaded hole 212 is provided with a lower annular flange 202 at a lower surface of the support platform 210 so as to form a snap fit with the upper surfaces of the convex buckles 610, which is beneficial to avoiding contact between the upper surfaces of the convex buckles 610 and the main body plate surface of the support platform 210.

Both a top section of the first unthreaded hole 211 and a top section of the second unthreaded hole 212 may be bell mouth shaped. Each adjustment portion can be pressed against the upper surface of the support platform 210 by means of an annular gasket or an annular protrusion 452 formed on the lower surface of the adjustment portion, which can reduce the contact area between the adjustment portion and the upper surface of the support platform 210, thereby being beneficial to reducing the frictional resistance when the adjustment portion rotates. The annular gaskets may be disposed between the lower surfaces of the adjustment rotary discs and the upper surface of the support platform 210. The annular protrusions 452 may be formed on the lower surfaces of the adjustment rotary discs. The annular protrusion 452 of each adjustment portion can be pressed against the outer periphery of the corresponding unthreaded hole.

In some alternative embodiments, the adjustment portions may not be provided with the annular washers and the annular protrusions 452, and the lower surfaces of the adjustment portions may be planar and directly pressed against the upper surface of the support platform 210, which is beneficial to improving the mechanical strength of the installation foot 10.

Figure 6:
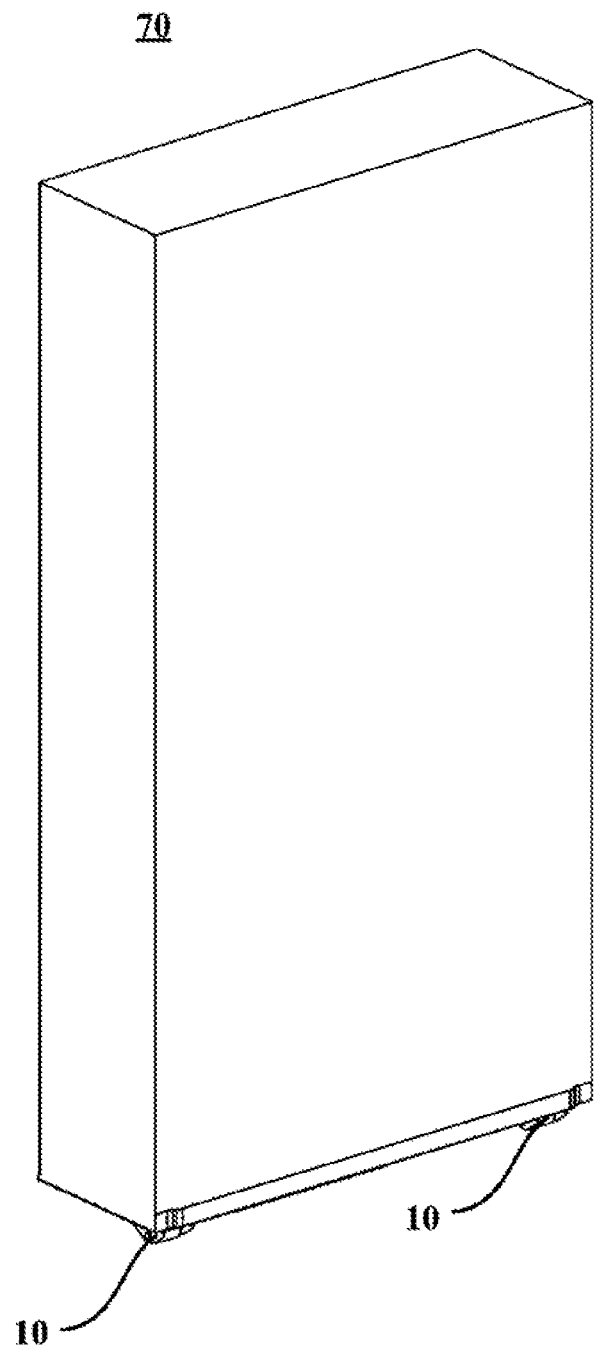
FIG. 6 is a schematic diagram of a refrigerator according to an embodiment of the present invention.

FIG. 6 is a schematic diagram of a refrigerator 70 according to an embodiment of the present invention. At least one installation foot 10 according to any one of the above embodiments is disposed at a bottom of the refrigerator 70. The bottom of the refrigerator 70 is provided with a first threaded hole and a second threaded hole. Screw rods of the installation foot 10 are in a screwed connection with the threaded holes. The first screw rod 410 is in a screwed connection with the first threaded hole, and the second screw rod 510 is in a screwed connection with the second threaded hole.

Because the installation foot 10 of the refrigerator 70 of the embodiment has both a leveling function and a moving function, it is possible to reduce or avoid the installation of other auxiliary structures on the bottom of the refrigerator 70, thereby simplifying the installation structure of the refrigerator 70 and reducing the manufacturing cost.

There may be four installation feet 10, two of which may be disposed at a front side of the bottom of the refrigerator 70, and the other two of which may be disposed at a rear side of the bottom of the refrigerator 70.

In some other alternative embodiments, there may be two installation feet 10, both of which are disposed at the rear side of the bottom of the refrigerator 70. The front side of the bottom of the refrigerator 70 may be provided with a rollable front wheel.

The threaded holes are formed in a bottom plate of the refrigerator 70. The bottom plate can be directly a bottom plate of a refrigerator body of the refrigerator 70, or can be an additional bottom plate on the refrigerator body. The bottom plate of the refrigerator 70 is provided with a screw cylinder extending upward from a plate surface where the bottom plate is located, and the threaded holes are formed in the screw cylinder.

According to the installation foot 10 and the refrigerator 70 having same of the embodiments, the installation foot 10 includes the support base, the roller wheel, the first adjustment portion 400 and the second adjustment portion 500. The roller wheel is rotatably disposed under the support platform 210 of the support base, and the first adjustment portion 400 and the second adjustment portion 500 are separately provided with the screw rod rotatably disposed on the support platform 210, and the adjustment rotary disc for driving the screw rod to rotate. In an installation process, the roller wheel is able to roll along a supporting surface on which the installation foot 10 is located, and the screw rod can rotate relative to the support platform 210, so that the installation foot 10 of the embodiments is both suitable for a leveling process of an apparatus and suitable for a moving process of the apparatus, and is also small in volume, simple and easy to adjust, large in adjustment range and low in manufacturing cost. By adopting the installation foot 10 of the embodiments, the installation difficulty of the apparatus can be reduced, the installation efficiency can be increased, and the labor cost is thus lowered.

According to the installation foot 10 and the refrigerator 70 having same of the embodiments, the first adjustment rotary disc 420 of the first adjustment portion 400 and the second adjustment rotary disc 520 of the second adjustment portion 500 are both discs with gear teeth on their outer peripheral edges, and the gear teeth of the second adjustment rotary disc 520 can be in transmission meshing with the gear teeth of the first adjustment rotary disc 420. During the installation of the apparatus, the wrench tool and/or the drive belt can also be used to adjust the first adjustment rotary disc 420 and make the first adjustment rotary disc 420 drive the second adjustment rotary disc 520 to rotate so as to simultaneously adjust the screwing depths of the first screw rod 410 and the second screw rod 510 into the corresponding threaded holes, which can not only ensure the adjustment stability of the apparatus, but also simplify the adjustment process of the installation foot 10.

So far, those skilled in the art should realize that although a plurality of exemplary embodiments of the present invention have been illustrated and described in detail herein, many other variations or modifications consistent with the principles of the present invention may be directly determined or derived from the contents disclosed by the present invention without departing from the spirit and scope of the present invention. Therefore, the scope of the present invention should be understood and deemed to cover all these other variations or modifications.

What is claimed is:

1. An installation foot, comprising:
   a support base, a part of which forms a support platform;
   a roller wheel, rollably disposed below the support platform;
   a first adjustment portion, provided with a first screw rod and a first adjustment rotary disc, the first screw rod being rotatably disposed on the support platform, and the first adjustment rotary disc being fixedly connected to the first screw rod or integrated with the first screw rod to form a one-piece part so as to drive the first screw rod to rotate; and
   a second adjustment portion, provided with a second screw rod and a second adjustment rotary disc, the second screw rod being rotatably disposed on the support platform, and the second adjustment rotary disc being fixedly connected to the second screw rod or integrated with the second screw rod to form a one-piece part so as to drive the second screw rod to rotate.

2. The installation foot according to claim 1, wherein the first adjustment rotary disc and the second adjustment rotary disc are both disc-shaped;
   a plurality of first gear teeth are formed on an outer peripheral edge of the first adjustment rotary disc to match a wrench tool and/or a drive belt; and
   a plurality of second gear teeth are formed on an outer peripheral edge of the second adjustment rotary disc to match the wrench tool and/or the drive belt.

3. The installation foot according to claim 2, wherein the disc diameter of the first adjustment rotary disc is larger than that of the second adjustment rotary disc;
   the second gear teeth are in transmission meshing with the first gear teeth; and
   the screw direction of the first screw rod is opposite to that of the second screw rod.

4. The installation foot according to claim 1, wherein the rotation axes of the first adjustment rotary disc and the first screw rod are coaxial with the central axis of the first adjustment rotary disc and the central axis of the first screw rod; and the first adjustment rotary disc extends radially outwards from a bottom section of the first screw rod; and
   the rotation axes of the second adjustment rotary disc and the second screw rod are coaxial with the central axis of the second adjustment rotary disc and the central axis of the second screw rod; and the second adjustment rotary disc extends radially outwards from a bottom section of the second screw rod.

5. The installation foot according to claim 1, wherein the support platform is a horizontal plate wall portion on the support base;
   the roller wheel comprises a wheel shaft extending in a horizontal direction, and a wheel body rotating around the wheel shaft; and
   the support base further comprises:
   a downturned shaft connecting portion, extending downward from the support platform and having a shaft hole for matching with the wheel shaft so as to enable the wheel shaft to be rotatably connected to the support base.

6. The installation foot according to claim 1, wherein the support platform is provided with a first unthreaded hole and a second unthreaded hole which run through a thickness direction of a main body plate surface of the support platform;
   the first adjustment portion is positioned above the first unthreaded hole, and the second adjustment portion is positioned above the second unthreaded hole; and
   the installation foot further comprises:
   a first connecting piece, one end of which is fixedly connected to the first adjustment portion or is integrated with the first adjustment portion to form a one-piece part, and the other end of which passes through the first unthreaded hole and is matched with a lower peripheral edge of the first unthreaded hole to limit the freedom of the first adjustment portion to move in a straight line relative to the support platform in its rotation axis direction; and
   a second connecting piece, one end of which is fixedly connected to the second adjustment portion or is integrated with the second adjustment portion to form a one-piece part, and the other end of which passes through the second unthreaded hole and is matched with a lower peripheral edge of the second unthreaded hole to limit the freedom of the second adjustment portion to move in a straight line relative to the support platform in its rotation axis direction.

7. The installation foot according to claim 6, wherein both the first connecting piece and the second connecting piece are hollow cylindrical claws with a plurality of convex buckles in the circumferential directions of lower edges thereof, each of the convex buckles has an interstice opening between peripheral wall sections of the claw where it is located, a lower surface of each of the convex buckles is an inclined surface that is inclined upward in a radial outward direction, and an upper surface of each of the convex buckles is a plane perpendicular to peripheral walls of the claws.

8. The installation foot according to claim 7, wherein each of the hole wall of the first unthreaded hole and the hole wall of the second unthreaded hole is provided with a lower annular flange on a lower surface of the support platform so as to form a snap fit with the upper surfaces of the convex buckles.

9. The installation foot according to claim 6, wherein the first unthreaded hole and the second unthreaded hole are symmetrically disposed with respect to the central axis of the support platform.

10. A refrigerator, comprising:
    at least one installation foot according to claim 1, disposed at a bottom of the refrigerator, the bottom of the refrigerator being provided with a first threaded hole and a second threaded hole, the first screw rod being in a screwed connection with the first threaded hole, and the second screw rod being in a screwed connection with the second threaded hole.

* * * * *